Patented Jan. 6, 1925.

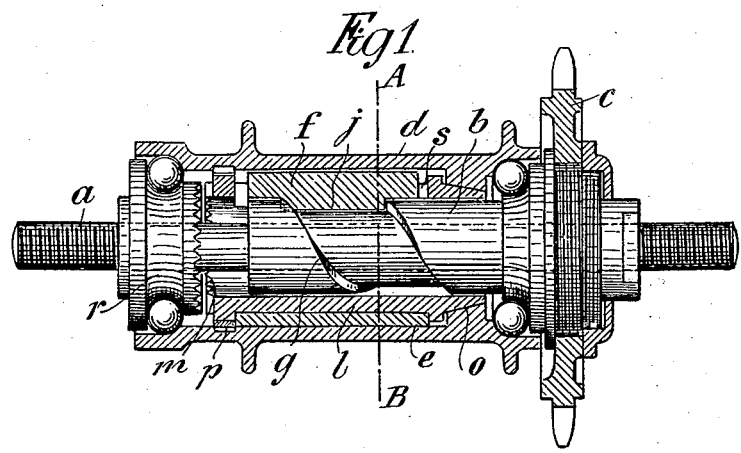
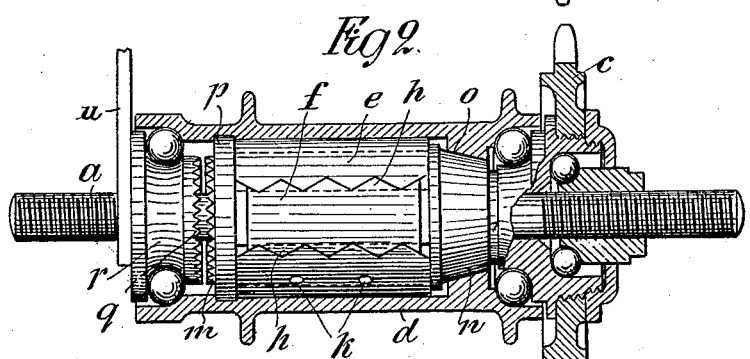
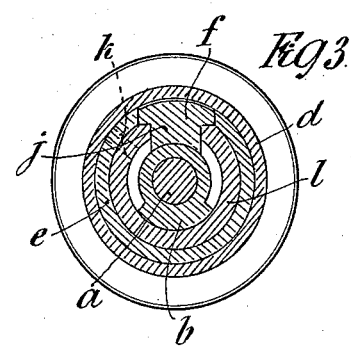
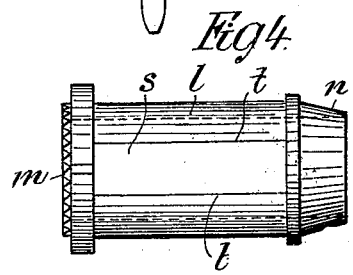
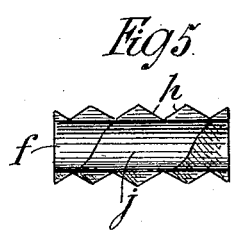

1,521,706

UNITED STATES PATENT OFFICE.

FREDERIK JOHANNES OLSEN, OF ESKEBJERGGAARD PR. ALLESHAVE, DENMARK.

BACK-PEDALING BRAKE.

Application filed November 2, 1923. Serial No. 672,375.

*To all whom it may concern:*

Be it known that I, FREDERIK JOHANNES OLSEN, a subject of the King of Denmark, residing at Eskebjerggaard pr. Alleshave, Denmark, have invented new and useful Improvements in Back-Pedaling Brakes; and I do hereby declare the following to be a full, clear, and exact description of the same.

This invention relates to back pedaling brakes of the kind in which a wedging member engaging a screw-threaded driving member is accommodated within the gap of a longitudinally split sliding sleeve mounted inside a hub and adapted to be expanded into frictional contact with the hub by means of the said wedging member, the latter and the sleeve being so formed as to be moved axially in either direction by means of the screw-threaded driving member.

In a previous construction of this general kind both ends of the split sleeve were provided with teeth, adapted to engage with teeth formed on a fixed member and on the hub respectively, but the teeth extended only over a comparatively small part of each end surface of the sleeve in order to allow the same to be expanded and to contract freely without being checked by the engagement of the teeth with the teeth of the said fixed member or hub.

According to the present invention the split yielding brake sleeve co-acting with the wedging member and with the hub is mounted upon a separate supporting member (such as a cylinder or tubular member) provided with clutch elements at both ends and adapted to be moved axially as a whole together with the brake sleeve. The supporting member may be provided with an opening through which the wedging member comes into engagement with the screw-threaded driver. By thus mounting the expansible brake sleeve upon such a separate supporting member which latter is not expanded by the wedging member it is made possible to provide one end surface or both end surfaces of the supporting member with a complete series of clutch teeth whereby a more reliable engagement is obtained, and if desired the clutch element at one end of the supporting member may be formed as a conical friction clutch element. As the brake sleeve itself is not provided with clutch elements at its ends it is more cheap to make than the sleeve of the braking mechanism above referred to and may be renewed at smaller costs. Furthermore it may be made of a material particularly well suited for braking purposes, such as bronze.

The opening in the supporting member is preferably provided with edges extending parallel to the axis of the hub and serving as a guide for the wedging member whereby when the sleeve is expanded the wedging action exerted by the wedging member is uniformly distributed over the whole length of the sleeve.

An embodiment of the invention is shown in the drawings in which—

Figure 1 is a partial vertical section through a coaster hub constructed according to the invention, Figure 2 is a partial horizontal section through the same, Figure 3 is a cross section on the line A—B in Figure 1, Figure 4 is a view of the supporting cylinder adapted to carry the split sleeve and Figure 5 is a view of the wedging member which coacts with the screw-threaded driving member and the sleeve.

$a$ is the fixed shaft, $b$ the driving member with the sprocket $c$ for the sprocket chain, and $d$ is the outer hub. In the cylindrically bored hub $d$ is inserted a cylindrical sleeve $e$ which is split and is of such a diameter that normally it does not touch the wall of the outer hub $d$. The sleeve $e$ is split longitudinally throughout its length and has a part of the wall thereof removed as shown in Figure 2, and in the space thus formed a wedging member $f$ is inserted. This latter member has a curved cylindrical upper face and a projecting portion $j$ on its under surface which is shaped on a helical line and adapted to coact with screw threads $g$ formed on the driving member $b$. Both edges of the member $f$ are provided with coarse teeth $h$ with oppositely sloping faces adapted to engage with corresponding faces formed on the edges of the slit in the sleeve $e$. The sleeve $e$ is carried upon a hollow supporting cylinder $l$, one end of which is provided with clutch teeth $m$ while the other end is formed as a conical clutch element $n$ adapted to coact with a corresponding conical surface $o$ formed on the inner side of the hub $d$. The sleeve is only secured to this supporting cylinder at a line near one edge of the sleeve, preferably by means of two rivets or screws $k$ as shown in Figures 2 and 3. The cylinder $l$ has a longitudinal slot $s$ ending at some distance from the ends of the cylinder and bounded by two straight edges $t$ which are parallel to the axis of the hub. The portion $j$ of the wedging member comes into engagement with the driving member $b$ through this slot $s$, the edges $t$ of which serving as guide for the wedging member. On the fixed shaft $a$ is screwed a nut $r$ having teeth $q$ adapted to engage with the teeth $m$ on one end of the cylinder $l$ as shown. The nut $r$ is held against rotation by an arm $u$ the end of which is secured to the frame of the vehicle in any well known manner, the arm $u$ and the nut $r$ acting as a brake anchor. Inside the outer hub $d$ is arranged a flat spring $p$ of known kind, one end of which slides on the circumference of the cylinder $l$, thereby producing a small amount of friction.

The operation of the device is as follows:

The parts being in the position shown in the drawing, the driving member occupies a position so as to allow the outer hub to turn freely so that the vehicle is able to free-wheel down hill. On forward pedaling the driving member will displace the wedge $f$ to the right which will cause a displacement of the sleeve $e$ and the cylinder $l$ so that the conical clutch element $n$ on the right end of the cylinder will engage the conical surface $o$. By further forward pedaling the teeth $h$ will more forcibly engage with the corresponding teeth of the edges of the sleeve $e$ and expand the same so as to cause it to bear against the inner surface of the hub $d$, thereby generating a considerable friction allowing the torque to be transmitted from the driving member to the hub. If now the pedals are kept immobile while the vehicle runs forward, the sleeve $e$ and its supporting cylinder will be displaced to the left so that the cone on the right end of the cylinder is disengaged from the conical surface $o$, and the sleeve will be released and contract itself, so that free running can now take place without any hindrance. Owing to the effect of the friction spring $p$ the sleeve $e$ is displaced to the left until the teeth on the left end of the cylinder engage the teeth on the nut $r$, and on back pedaling the wedge $f$ will be displaced to the left by the screw threads on the driving member, causing the sleeve $e$ to be expanded and effecting braking in the well known manner.

Having thus fully described my invention I claim as new and desire to secure by Letters Patent:

1. In a brake mechanism, the combination of an axle, a hub thereon, a driving member, a brake anchor, a longitudinally movable expansible friction-brake member mounted within the hub, a supporting member carrying said friction-brake member, said friction-brake member and supporting member being connected to each other so as to move in unison in the longitudinal and circumferential directions while allowing expansion and contraction of the friction-brake member, and means actuated by said driving member for connecting said supporting member to said brake anchor by longitudinal movement of the former in the hub and expanding said brake member against said hub.

2. In a brake mechanism, the combination of an axle, a hub thereon, having a clutch element, a driving member projecting into said hub, a stationary brake support having a clutch element, a longitudinally movable expansibe friction-brake member mounted within the hub, a non-expansible supporting member carrying said friction-brake member and provided with clutch elements at both ends, said friction-brake member and supporting member being connected to each other so as to move in unison in the longitudinal and circumferential directions while allowing expansion and contraction of the friction-brake member, and means actuated by said driving member for connecting the clutch element at one end of said supporting member with the clutch element of said stationary brake support by longitudinal movement of the supporting member in the hub and expanding said brake member against said hub.

3. In a brake mechanism, the combination of an axle, a hub thereon, a driving member projecting into the hub and provided with screw threads, a stationary brake support having a clutch element, a yieldingly expansible brake sleeve within the hub having one longitudinal slot throughout its length, a wedging member engaging the screw threads of said driving member and adapted to be moved in the slot to thereby expand the brake sleeve against the hub, and a supporting member carrying said brake sleeve and connected thereto so as to move longitudinally and angularly as a unit therewith and provided with a clutch element, said supporting member being adapted to be moved longitudinally by said wedging member into engagement with the brake support to hold the supporting member and the sleeve stationary, after which the sleeve is expanded against said hub by further movement of the said wedging member.

4. In a coaster hub, the combination of an outer hub member, an expansible brake sleeve mounted within said hub member and having a longitudinal slot throughout its length, at least one edge of the sleeve adjacent the slot being provided with teeth with oppositely sloping faces, a supporting cylinder surrounded by said sleeve and connected thereto so as to move longitudinally and angularly therewith as a unit and having an opening, a wedging member positioned in said slot and having teeth adapted to engage said teeth, and a driving member projecting into said supporting cylinder and provided with screw threads engaged by said wedging member through the opening in said supporting cylinder.

5. The coaster hub of claim 4, in which one end of the supporting cylinder is provided with a circular row of clutch teeth and the other end is formed with a conical surface.

6. The coaster hub of claim 4, in which the brake sleeve is only secured to the supporting cylinder at points in a line near one longitudinal edge of the sleeve.

7. The coaster hub of claim 4, in which the opening of the supporting cylinder falls short of the ends of the same and has straight edges parallel to the axis of the hub, said edges serving as a guide for the wedging member.

8. In a brake mechanism, the combination of an axle, a hub thereon, a driving member, a brake anchor, a longitudinally movable cylindrical expansible friction brake member having a single slot throughout its length and mounted within the hub, a supporting member carrying said friction brake member, said friction brake member and supporting member being connected to each other so as to move in unison in the longitudinal and circumferential directions while allowing expansion and contraction of the friction brake member, and means actuated by said driving member for connecting said supporting member to said brake anchor by longitudinal movement of the former in the hub and expanding said brake member against said hub.

9. In a brake mechanism, the combination of an axle, a hub thereon, having a clutch element, a driving member projecting into said hub, a stationary brake support having a clutch element, a longitudinally movable expansible friction brake member mounted within the hub, a non-expansible supporting member carrying said friction brake member and provided with clutch elements at both ends, said friction brake member and supporting member being connected to each other so as to move in unison in the longitudinal and circumferential directions while allowing expansion and contraction of the friction brake member, and means actuated by said driving member for connecting the clutch element at one end of said supporting member with the clutch element of said stationary brake support by longitudinal movement of the supporting member in one direction in the hub and expanding said brake member against said hub, and for connecting the clutch element at the opposite end of said supporting member with the clutch element of said hub by longitudinal movement of the supporting member in the opposite direction in the hub and expanding said brake member against said hub, whereby said brake member can be brought into frictional engagement with said hub for braking purposes as well as for forward driving purposes.

10. The coaster hub of claim 4, in which one end of the supporting cylinder is provided with a circular row of clutch teeth and the other end is formed with a conical friction clutch surface.

11. In a coaster hub according to claim 4, wherein said wedging member engages the screw threads of said driving member from one side only and is capable of being released from the driving member by being removed in a direction perpendicular to the axis of the hub through said opening in the supporting cylinder and said slot in the brake sleeve.

12. In a coaster hub according to claim 4, wherein the said brake sleeve is of spring-like material of a nature such that the sleeve, when brought into frictional engagement with the inner surface of said outer hub member and thereafter released from the influence of said wedging member, is capable of contracting and disengaging itself from the outer hub member without the aid of any auxiliary spring.

In testimony whereof I have affixed my signature in presence of two witnesses.

FREDERIK JOHANNES OLSEN.
Witnesses:
  GEORGE BLAUR,
  C. V. HÓGSTED.